United States Patent
Chiu

(10) Patent No.: US 8,089,250 B2
(45) Date of Patent: Jan. 3, 2012

(54) METHOD AND DEVICE FOR PROTECTING BATTERY OF ELECTRONIC DEVICE FROM OVERHEATING

(75) Inventor: Chia-Chang Chiu, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 762 days.

(21) Appl. No.: 12/211,366

(22) Filed: Sep. 16, 2008

(65) Prior Publication Data

US 2010/0066308 A1 Mar. 18, 2010

(51) Int. Cl.
*H01M 10/46* (2006.01)
(52) U.S. Cl. ...................................... 320/150
(58) Field of Classification Search ............ 320/17, 320/112, 115, 134, 136, 150, 153
See application file for complete search history.

(56) References Cited

U.S. PATENT DOCUMENTS

| | | | | |
|---|---|---|---|---|
| 6,563,290 | B2 * | 5/2003 | Sakakibara et al. | 320/106 |
| 6,928,381 | B2 * | 8/2005 | Becker-Irvin et al. | 320/150 |
| 2006/0139007 | A1 * | 6/2006 | Kim | 320/134 |
| 2007/0182373 | A1 * | 8/2007 | Sakakibara et al. | 320/115 |
| 2008/0076011 | A1 * | 3/2008 | Emori et al. | 429/62 |

* cited by examiner

*Primary Examiner* — Edward Tso
(74) *Attorney, Agent, or Firm* — Apex Juris, pllc; Tracy M. Heims

(57) ABSTRACT

A method for protecting a battery of an electronic device from overheating is provided. The method senses the temperature of the battery and conduct an unloading action when the temperature of the battery ascends to an unloading temperature. The method further halts the unloading action when the temperature of the battery descends to a lowest critical temperature, wherein the unloading temperature is not lower than the lowest critical temperature.

12 Claims, 3 Drawing Sheets

METHOD AND DEVICE FOR PROTECTING BATTERY OF ELECTRONIC DEVICE FROM OVERHEATING

BACKGROUND OF THE INVENTION

1. Field of the Invention

The invention relates to a method for protecting batteries, and more particularly to a method for protecting a battery in an electronic device from overheating.

2. Description of the Related Art

Small-sized high-performance batteries are already being applied to many kinds of portable electronic devices, such as notebook computers, mobile phones and digital cameras, due to their high energy density and rechargeability.

However, despite technological advances, small-sized high-performance batteries may still cause damage to portable electronic devices or explode when in operation due to overheating. As such, some portable batteries have built-in battery protection methods. One of the most popular battery protection methods used, is setting a battery cut-off temperature. Specifically, for built-in battery protection methods in batteries, when the battery temperature of a battery ascends to a cut-off temperature, the battery will immediately shut-down and protect itself from overheating and damage.

Nevertheless, the method for setting the battery cut-off temperature abruptly shuts-down the portable electronic device, which may result in inconvenience to the user or damage or loss of programs or processing files.

BRIEF SUMMARY OF INVENTION

In an embodiment of the present invention, an electronic device comprises a battery, a battery temperature detector and a control module. The battery temperature detector is coupled to the battery and is used to detect the temperature of the battery, the control module is coupled to the battery temperature detector, set at a lowest critical temperature and at least an unloading temperature and used to conduct an unloading action when the temperature of the battery ascends to the unloading temperature and halt the unloading action when the temperature of the battery descends to the lowest critical temperature, wherein the unloading temperature is not lower than the lowest critical temperature.

In another embodiment of the present invention, a method for protecting a battery in an electronic device from overheating comprises the steps of: sensing the temperature of the battery, conducting an unloading action when the temperature of the battery ascends to an unloading temperature, and halting the unloading action when the temperature of the battery descends to a lowest critical temperature, wherein the unloading temperature is not lower than the lowest critical temperature.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
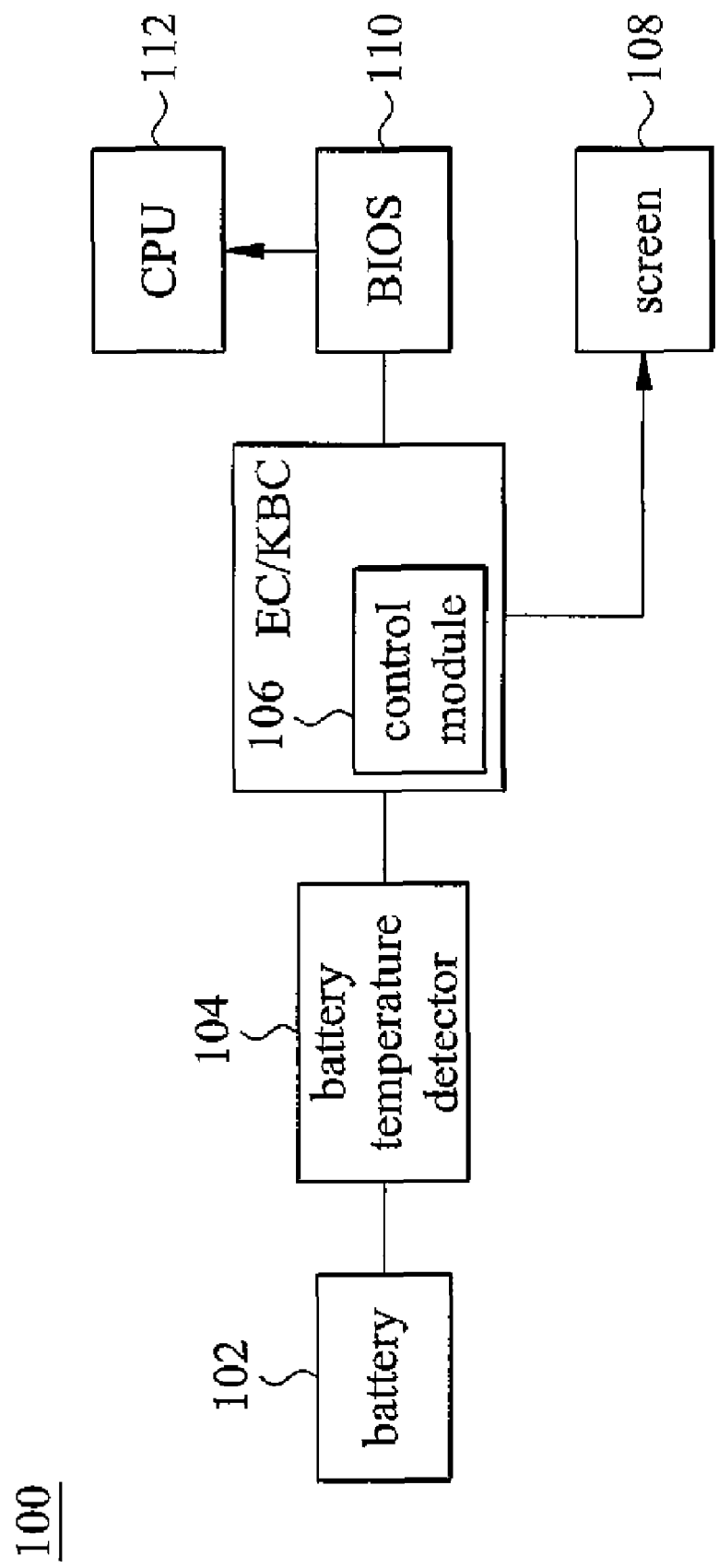
FIG. 1 is a schematic diagram of an electronic device comprising a battery according to the invention.

FIG. 1 is a schematic diagram of an electronic device 100 comprising a battery 102 according to the present invention. In a preferred embodiment, the electronic device 100 may be a notebook computer, and the battery 102 may be the battery of the notebook computer. The battery 102 supplies power to the notebook computer when there is no AC (alternating current) source supplying power to the notebook computer.

The electronic device 100 of the present invention further comprises a battery temperature detector 104, which is coupled to the battery 102 and used to detect the temperature of the battery. The electronic device 100 also comprises a control module 106, which is coupled to the battery temperature detector 104 and may be an embedded controller (EC) or a keyboard controller (KBC) of the notebook computer 100 or a firmware of the EC or the KBC configured to implement the present invention. The control module 106, for example, may be set at a first temperature 64° C., a second temperature 66° C. higher than the first temperature 64° C. and a third temperature 68° C. higher than the second temperature 66° C. It should be noted that although there are only three temperatures set in this embodiment, the invention is not limited thereto. There may be any other amount of temperatures or different temperatures set, according to requirements. A cut-off temperature 70° C., may be set in the control module 106 of the invention, at being higher than the first temperature 64° C., the second temperature 66° C. and the third temperature 68° C. When the temperature of the battery 102 ascends to the cut-off temperature 70° C., the control module 106 may cut-off the battery power or shut down the computer to protect the computer from damage due to overheating. Although the purpose of the invention is to keep the temperature of the battery 102 lower than the cut-off temperature 70° C., however, various kinds of inevitable cases may cause the electronic device 100 to overheat, thus, other practiced cut-off measures should not be omitted.

According to the invention, when the battery 102 temperature ascends because of over-discharging or outside circumstances, the control module 106 may implement a series of actions to suppress temperature of the battery 102 from ascending to over the cut-off temperature. With the series of actions of the invention, the electronic device 100 may prevent the battery 102 from abruptly shutting-down, and eliminate problems which may result in inconvenience to the user or damage or loss of programs or processing files. The detailed method will be discussed below.

Figure 2A:
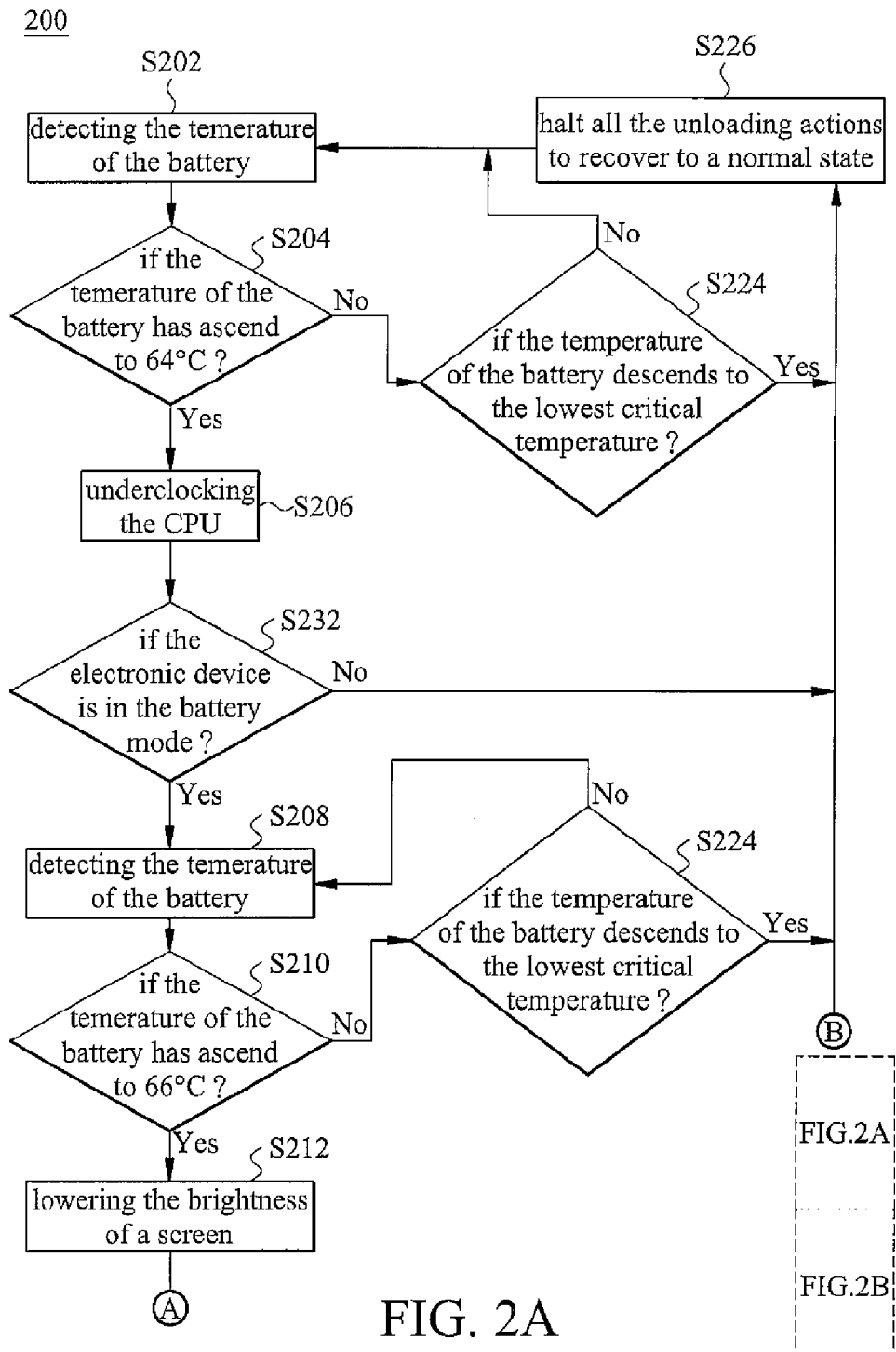
FIG. 2A, 2B are flow charts of the method for protecting a battery of an electronic device from overheating according to the present invention.
Figure 2B:
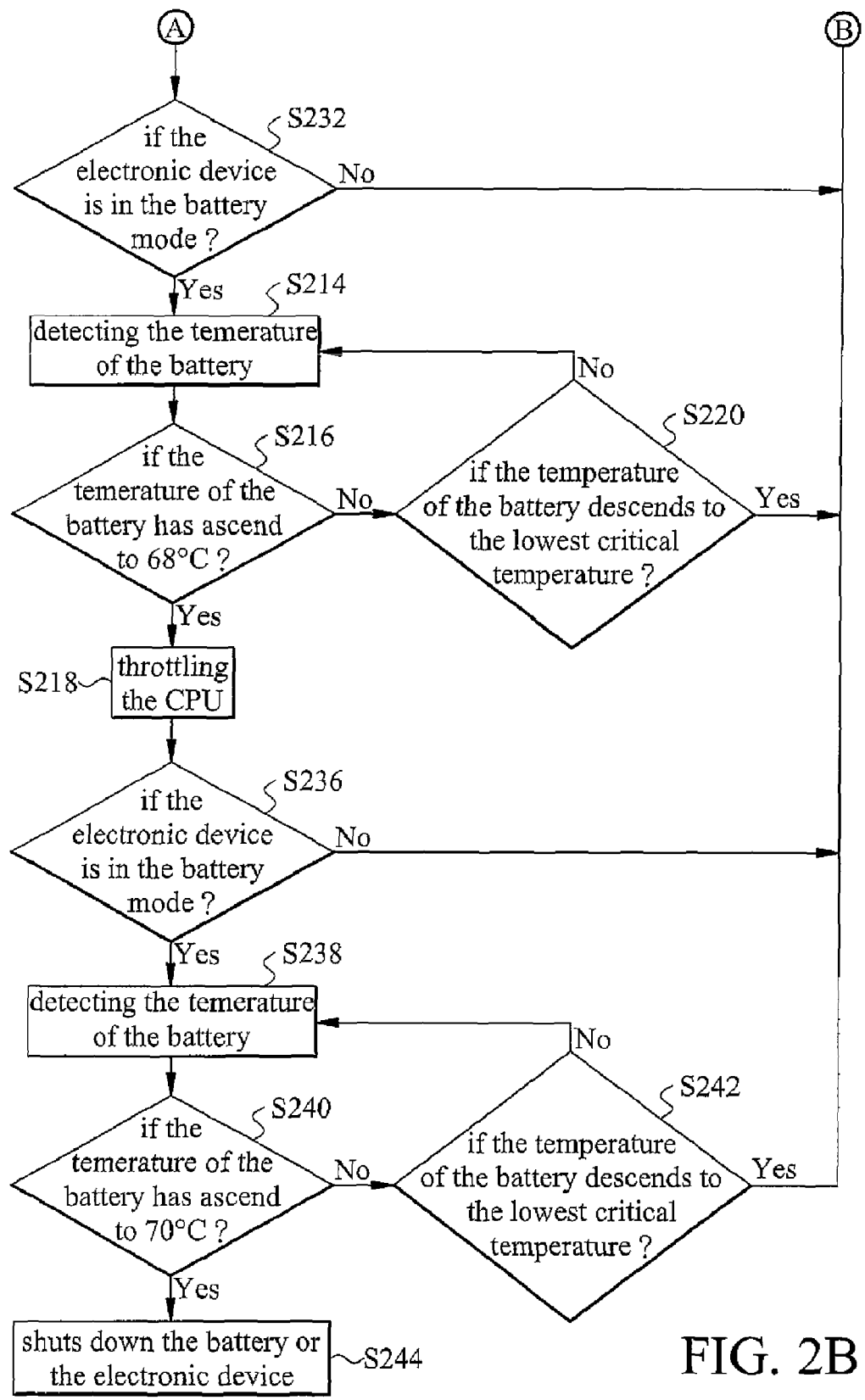

Referring to FIGS. 2A and 2B, which are flow charts, of a method for protecting a battery of an electronic device from overheating according to the invention. It should be noted that the battery temperature detector 104 may continuously detect the power source of the electronic device 100 before or during implementation of the method of the invention. When the electronic device 100 is coupled to the battery 102, the electronic device 100 is said to be in a battery mode, and power may be directly supplied by the battery. Since the purpose of the invention is to prevent the battery from ascending to the cut-off temperature, if the electronic device 100 is in another power mode, such as in an AC-in mode, there may be no need to protect the battery from overheating. Therefore, in the method of the invention, the control module 106 must detect whether the electronic device 100 is in the battery mode in the steps S232, S234 and S236 in FIGS. 2A and 2B. If yes, the method proceeds to other steps, if no, the method proceeds to step S226. In the step S202, the control module 106 detects that the temperature of the battery has ascended to the first temperature 64° C., in the step S206, the control module 106 conducts a first unloading action, which is to underclock a CPU (central processing unit) 112 in the electronic device 100, for example, to downclock or to reduce the frequency of the CPU from 800 HZ to 600 HZ. For example, the control module 106 may send a signal via an SCI (System Control Interface) or SMI (System Management Interface), to inform the BIOS (Basic Input/Output System) 110 of the first unloading action, and then the BIOS 110 will inform the CPU 112 to underclock to a required frequency. The invention employs the first unloading action to attempt to lower the temperature of the battery by reducing the power consumption of the battery 102. In the step S208, the battery temperature detector 104 continuously detects the temperature of the battery 102 after the underclocking procedure. However, in the step S210, if the temperature of the battery does not descend, but continues to ascend to the second temperature 66° C., the control module 106 further conducts a second unloading action in the step S212, which is to lower the brightness of a screen in the electronic device 100. Similarly, the invention employs the second unloading action to attempt to lower the temperature of the battery by reducing the power consumption of the battery 102. In the step S214, the battery temperature detector 104 continuously detects the temperature of the battery 102 after lowering the brightness of a screen in the electronic device 100. However, in the step S216, if the temperature of the battery does not descend, but continues to ascend to the third temperature 68° C., the control module 106 further conducts a third unloading action in the step S218, which is to throttle the CPU 112 of the electronic device 100. The invention employs the third unloading action to attempt to lower the temperature of the battery by reducing the power consumption of the battery 102. Finally, in the step S238, the battery temperature detector 104 continuously detects the temperature of the battery 102 after throttling the CPU 112 of the electronic device 100. However, in the step S240, if the temperature of the battery inevitably ascends to the cut-off temperature 70° C., in the step S244, the control module 106 directly shuts down the battery 102 or the electronic device 100.

As discussed above, the purpose of the unloading action is to reduce the power consumption of the battery in order to lower the temperature of the battery. However, it should be noted that although in the embodiments, the first, second and third unloading actions correspond to underclocking, lowering of brightness levels and throttling, respectively, they are not limited thereto. In other embodiments of the invention, the order, number and kind of unloading actions may be adjusted, combined or replaced. For example, every unloading action which is conducted during defined cases may simultaneously employ underclocking, lowering of brightness levels and throttling, but with different adjustment degrees.

The present invention is able to lower output load of a battery during discharge. In a normal case, the present invention not only slows down ascending temperatures of the battery, but also lowers battery temperatures. Additionally, frequency of defined cases for lowering output load of a battery may be accordingly adjusted. Thus, the control module 106 may be set at a lowest critical temperature, for example, 60° C., which is lower than the first temperature 64° C., the second temperature 66° C. and the third temperature 68° C.

As shown in step S220, S222 and S224, when the temperature of the battery 102 descends to the lowest critical temperature 60° C., in the step S226, the control module 106 halts the first, second and third unloading actions. Moreover, when the control module 106 detects that the electronic device 100 is in another power mode instead of the battery mode, it may inform the electronic device 100 to halt all the unloading actions to recover to a normal state in the step S226.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising;
a battery;
a battery temperature detector, coupled to the battery and used to detect the temperature of the battery; and
a control module coupled to the battery temperature detector, having a lowest critical temperature and at least an unloading temperature set thereof and being used to conduct an unloading action when the temperature of the battery ascends to the unloading temperature, the control module halting the unloading action when the temperature of the battery descends to the lowest critical temperature;
wherein the unloading temperature is set without being lower than the lowest critical temperature.

2. The electronic device as claimed in claim 1, wherein the control module detects whether the electronic device is supplied with power from the battery, the control module halting the unloading action if the electronic device is not supplied with power from the battery.

3. The electronic device as claimed in claim 1, further comprising a processor, wherein the unloading action is to underclock the processor.

4. The electronic device as claimed in claim 1 further comprising a screen, wherein the unloading action is to lower the brightness of the screen.

5. The electronic device as claimed in claim 1, further comprising a processor, wherein the unloading action is to throttle the processor.

6. The electronic device as claimed in claim 1, wherein the battery comprises a cut-off temperature, the control module cutting off the battery power to protect the battery from overheating when the temperature of the battery ascends to the cut-off temperature, the cut-off temperature is set without being lower than the unloading temperature.

7. A method for protecting a battery of an electronic device from overheating, comprising:
sensing the temperature of the battery;
conducting an unloading action when the temperature of the battery ascends to an unloading temperature; and
halting the unloading action when the temperature of the battery descends to a lowest critical temperature;
wherein the unloading temperature is set without being lower than the lowest critical temperature.

8. The method as claimed in claim 7, further comprising detecting whether the electronic device is supplied power by the battery, the control module halting the unloading action if the electronic device is not supplied power by the battery.

9. The method as claimed in claim 7, wherein the unloading action is to underclock a processor of the electronic device.

10. The method as claimed in claim 7, wherein the unloading action is to throttle a processor of the electronic device.

11. The method as claimed in claim 7, wherein the unloading action is to lower the brightness of a screen of the electronic device.

12. The method as claimed in claim 7, wherein the battery comprises a cut-off temperature, the control module cutting off the battery power to protect the battery from overheating when the temperature of the battery ascends to the cut-off temperature, the cut-off temperature is set without being lower than the unloading temperature.

* * * * *